United States Patent
Batenburg et al.

(10) Patent No.: US 10,601,217 B2
(45) Date of Patent: Mar. 24, 2020

(54) METHODS FOR DETECTING AN IMMINENT POWER FAILURE IN TIME TO PROTECT LOCAL DESIGN STATE

(71) Applicant: QUALCOMM Incorporated, San Diego, CA (US)

(72) Inventors: Michael Kevin Batenburg, San Diego, CA (US); Vincent Pierre Le Roy, San Diego, CA (US); Praveen Kumar Origanti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 15/499,450

(22) Filed: Apr. 27, 2017

(65) Prior Publication Data

US 2018/0316180 A1    Nov. 1, 2018

(51) Int. Cl.
  *G06F 17/50*    (2006.01)
  *G06F 13/10*    (2006.01)
  (Continued)

(52) U.S. Cl.
  CPC ............. *H02H 3/20* (2013.01); *G01R 19/165* (2013.01); *G06F 1/28* (2013.01); *G06F 17/5009* (2013.01);
  (Continued)

(58) Field of Classification Search
  CPC ............. G06F 17/5009; G06F 17/5081; G06F 2217/14; G06F 2217/78; G06F 13/10; G06F 13/12; G06F 11/00; G01R 31/00; G01R 21/00; G01R 25/00; G01R 27/28; H02H 3/20; H02H 1/0007; H02H 3/05; H02J 9/061
  (Continued)

(56) References Cited

U.S. PATENT DOCUMENTS 5,664,089 A    9/1997  Byers et al.
7,058,835 B1   6/2006  Sullivan et al.
(Continued)

FOREIGN PATENT DOCUMENTS

JP    2011027681 A  *  2/2011
WO    2006138077 A1    12/2006

OTHER PUBLICATIONS

International Search Report and Written Opinion—PCT/US2018/027805—ISA/EPO—dated Jul. 20, 2018.
(Continued)

*Primary Examiner* — Phallaka Kik
(74) *Attorney, Agent, or Firm* — Loza & Loza, LLP/Qualcomm

(57) ABSTRACT

In certain aspects of the disclosure, a chip includes an isolation device, wherein the isolation device is configured to allow a signal to pass from a first circuit in a first power domain to a second circuit in a second power domain via a signal line that crosses between the first and second power domains when the isolation device is disabled, and to clamp a portion of the signal line in the second power domain to a logic state when the isolation device is enabled. The chip also includes a failure detector configured to detect an imminent power failure of at least one of the first power domain or the second power domain, and to enable the isolation device in response to detection of the imminent power failure.

30 Claims, 15 Drawing Sheets

(51) Int. Cl.
*G06F 13/12* (2006.01)
*G06F 11/00* (2006.01)
*G01R 31/00* (2006.01)
*G01R 21/00* (2006.01)
*G01R 25/00* (2006.01)
*G01R 27/28* (2006.01)
*H02H 3/20* (2006.01)
*H02H 3/05* (2006.01)
*H02J 9/00* (2006.01)
*H02J 9/06* (2006.01)
*H02H 1/00* (2006.01)
*G01R 19/165* (2006.01)
*G06F 1/28* (2006.01)

(52) U.S. Cl.
CPC ............ *H02H 1/0007* (2013.01); *H02H 3/05* (2013.01); *H02J 9/061* (2013.01); *G06F 11/00* (2013.01); *G06F 13/10* (2013.01); *G06F 13/12* (2013.01); *G06F 17/5081* (2013.01); *G06F 2217/14* (2013.01); *G06F 2217/78* (2013.01)

(58) Field of Classification Search
USPC ....... 716/133, 136, 111; 703/16, 21; 702/59, 702/60, 63, 65, 117; 714/4.11, 4.12, 14, 714/25, 48, 724
See application file for complete search history.

(56) References Cited

U.S. PATENT DOCUMENTS

| | | | |
|---|---|---|---|
| 7,349,835 B2* | 3/2008 | Kapoor | G06F 17/5045 703/18 |
| 7,475,268 B2 | 1/2009 | Clemo et al. | |
| 8,719,598 B2 | 5/2014 | Searles et al. | |
| 9,536,038 B1* | 1/2017 | Quinton | G06F 17/5081 |
| 2004/0193955 A1 | 9/2004 | Leete et al. | |
| 2006/0064293 A1* | 3/2006 | Kapoor | G06F 17/5045 703/18 |
| 2006/0125470 A1* | 6/2006 | Chen | G01R 31/3008 324/750.3 |
| 2009/0315399 A1 | 12/2009 | Shikata | |
| 2010/0005439 A1 | 1/2010 | Shikata | |
| 2014/0281601 A1* | 9/2014 | Patel | G06F 1/3206 713/320 |
| 2015/0333517 A1* | 11/2015 | Paquin | H02J 3/38 700/286 |
| 2018/0074108 A1* | 3/2018 | Dulle | B60L 58/10 |

OTHER PUBLICATIONS

Onizawa N., et al., "Sudden Power-Outage Resilient In-Processor Checkpointing for Energy-Harvesting Nonvolatile Processors", IEEE Transactions on Emerging Topics in Computing, IEEE, USA, Apr. 1, 2017, vol. 5, No. 2, XP011651946, DOI: 10.1109/TETC.2016. 2604083 [retrieved on Jun. 5, 2017], pp. 151-163.

* cited by examiner

METHODS FOR DETECTING AN IMMINENT POWER FAILURE IN TIME TO PROTECT LOCAL DESIGN STATE

RELATED APPLICATION

BACKGROUND

Field

Aspects of the present disclosure relate generally to detecting power failure, and more particularly, to detecting imminent power failure on a chip.

Background

A chip may include multiple power domains, in which each power domain may be powered by a separate supply rail. The power domains allow circuits in different power domains to be powered at different supply voltages. The power domains may be independently power collapsed such that one power domain may be powered while another power domain is power collapsed.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a chip. The chip includes an isolation device, wherein the isolation device is configured to allow a signal to pass from a first circuit in a first power domain to a second circuit in a second power domain via a signal line that crosses between the first and second power domains when the isolation device is disabled, and to clamp a portion of the signal line in the second power domain to a logic state when the isolation device is enabled. The chip also includes a failure detector configured to detect an imminent power failure of at least one of the first power domain or the second power domain, and to enable the isolation device in response to detection of the imminent power failure.

A second aspect relates to a method for power failure mitigation on a chip. The chip includes a first circuit in a first power domain, a second circuit in a second power domain, and a signal line that provides communication between the first and second circuits and crosses between the first and second power domains. The method includes detecting an imminent power failure of at least one of the first power domain or the second power domain, and, in response to detection of the imminent power failure, clamping a portion of the signal line in the second power domain to a logic state.

A third aspect relates to an apparatus for power failure mitigation on a chip. The chip includes a first circuit in a first power domain, a second circuit in a second power domain, and a signal line that provides communication between the first and second circuits and crosses between the first and second power domains. The apparatus includes means for detecting an imminent power failure of at least one of the first power domain or the second power domain, and means for clamping a portion of the signal line in the second power domain to a logic state in response to detection of the imminent power failure.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
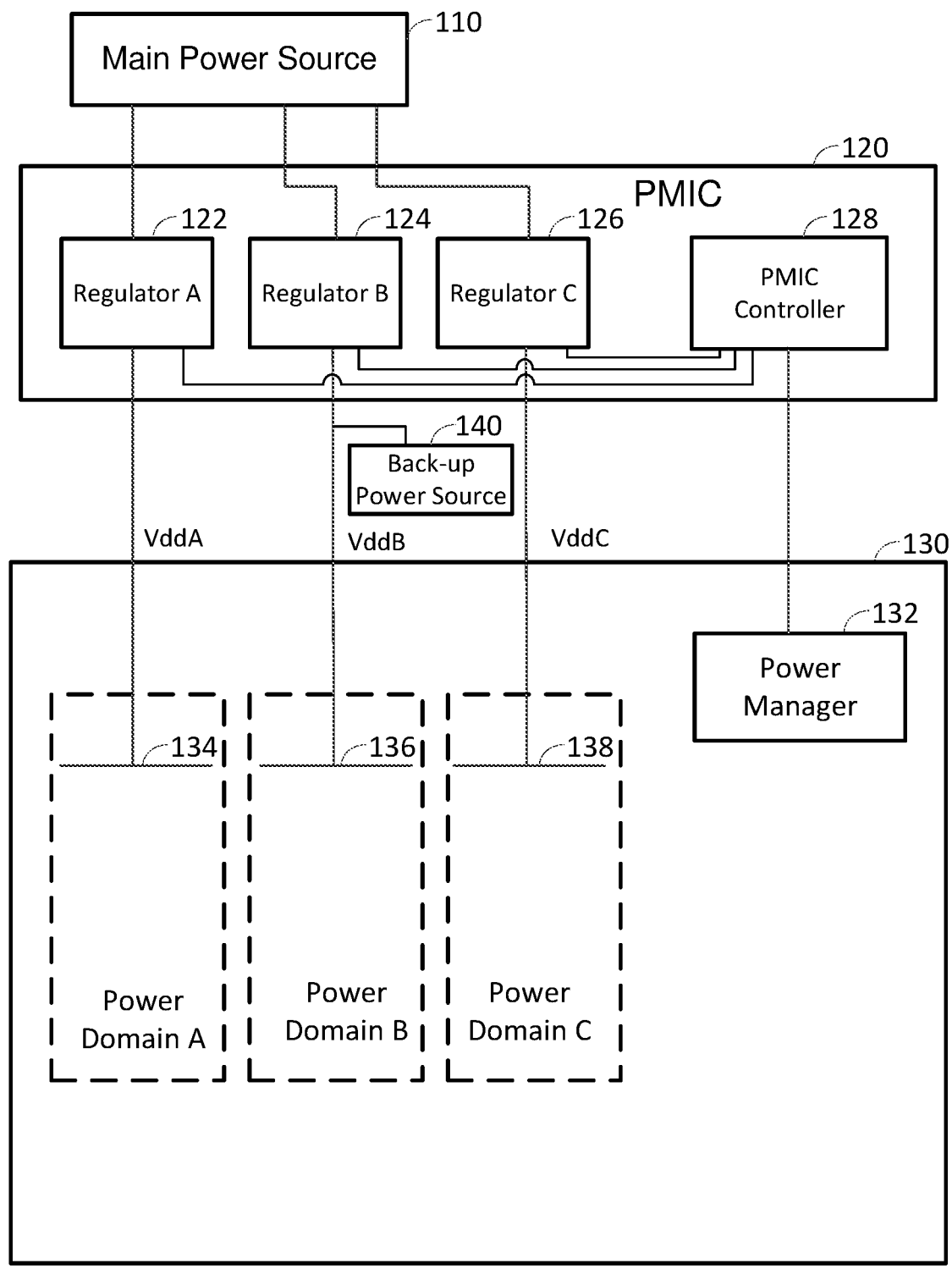
FIG. 1A shows an example of a chip and a back-up power source, in which the chip includes multiple power domains and the back-up power source is configured to provide back-up power in the event of power loss of a main power source according to certain aspects of the present disclosure.

A chip may include multiple power domains powered with respective supply voltages. In this regard, FIG. 1A shows an example of a chip 130 including multiple power domains. In the example shown in FIG. 1A, the chip 130 includes three power domains (labeled "Power Domain A", "Power Domain B" and "Power Domain C"). However, it is to be appreciated that the chip 130 may include a different number of power domains. Power Domain A includes a power supply rail 134 for supplying power to circuits (not shown) in Power Domain A, Power Domain B includes a power supply rail 136 for supplying power to circuits (not shown) in Power Domain B, and Power Domain C includes a power supply rail 138 for supplying power to circuits (not shown) in Power Domain C. Although the power domains are shown having the same shapes and sizes in FIG. 1A for simplicity, it is to be understood that the power domains may have different shapes and sizes depending, for example, on the layout of circuits on the chip 130.

The power supply rails 134, 136 and 138 are coupled to a power management integrated circuit (PMIC) 120, which may be external to the chip or on-chip. The PMIC 120 includes a first voltage regulator 122, a second voltage regulator 124, a third voltage regulator 126, and a PMIC controller 128. The first voltage regulator 122 is configured to convert a voltage from a main power source 110 into a supply voltage VddA for Power Domain A, the second voltage regulator 124 is configured to convert the voltage from the main power source 110 into a supply voltage VddB for Power Domain B, and the third voltage regulator 126 is configured to convert the voltage from the main power source 110 into a supply voltage VddC for Power Domain C. Each of the voltage regulators 122, 124 and 126 may be implemented with a switching regulator, a linear regulator (e.g., a low-dropout regulator) or a combination of both. The main power source 110 may include a battery (e.g., when the chip 130 is in a mobile device), and/or a power adapter that converts an AC voltage from an AC power outlet to a DC voltage that is input to the voltage regulators 122, 124 and 126.

The PMIC controller 128 may be configured to independently set the voltage levels of the supply voltages VddA, VddB, and VddC by varying one or more parameters of the respective voltage regulators 122, 124 and 126. For the example in which a voltage regulator is implemented with a switching regulator, the PMIC controller 128 may adjust the respective supply voltage by adjusting a duty cycle of the switching regulator.

In the example shown in FIG. 1A, a back-up power source 140 is coupled to the power supply rail 136 of Power Domain B. The back-up power source 140 is configured to provide power to Power Domain B when the PMIC 120 ceases supplying power to Power Domain B (e.g., due to unexpected removal of the main power source 110). In this way, the supply voltage VddB of Power Domain B is maintained after power loss at the PMIC 120. The back-up power source 140 may be external to the chip (as shown in the example in FIG. 1A) or on-chip.

The back-up power source 140 may be implemented using a rechargeable battery, a storage capacitor, or another type of energy-storage device. For the example of a rechargeable battery, the PMIC 120 may charge the rechargeable battery when the PMIC 120 is on to store energy in the rechargeable battery. When power is lost at the PMIC 120 (e.g., due to unexpected removal of the main power source 110), the rechargeable battery supplies power to Power Domain B.

Figure 1B:
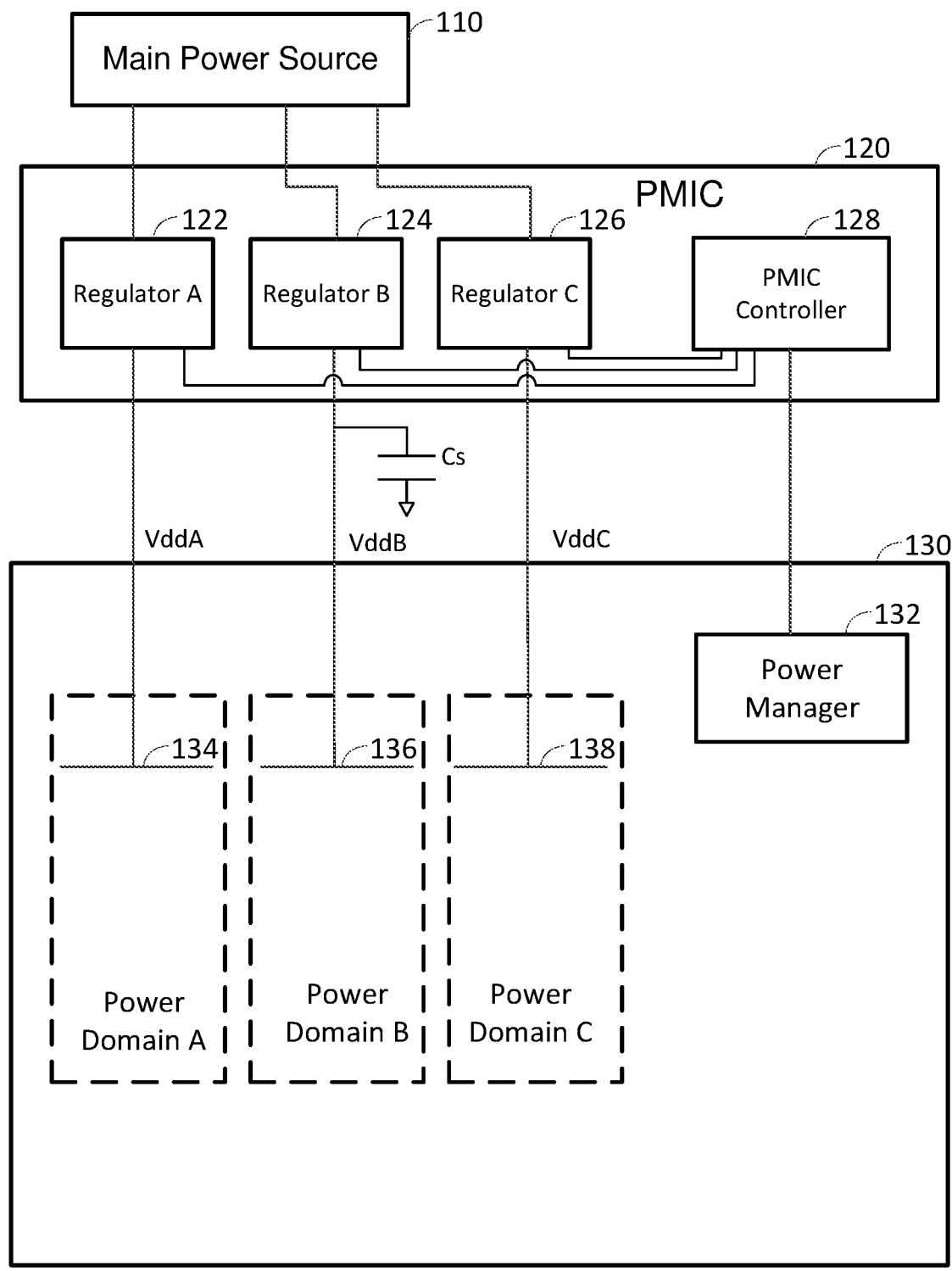
FIG. 1B shows an example in which the back-up power source is implemented with a storage capacitor according to certain aspects of the present disclosure.

FIG. 1B shows an example in which the back-up power source 140 is implemented with a storage capacitor (labeled "Cs") coupled to the power supply rail 136 of Power Domain B. The storage capacitor Cs stores charge from the PMIC 120 when the PMIC 120 is on. When the PMIC 120 ceases supplying power to Power Domain B (e.g., due to unexpected removal of the main power source 110), the charge stored in the storage capacitor Cs continues to power Power Domain B for a short period of time. In this way, the supply voltage VddB of Power Domain B is maintained for the short period of time after power loss at the PMIC 120. The storage capacitor Cs may be external to the chip (as shown in the example in FIG. 1B) or on-chip.

The chip 130 also includes a power manager 132 configured to manage power for the chip 130. For example, the power manager 132 may collapse a power domain when the circuits in the power domain enter an idle state to conserve power. The power manager 132 may do this by sending an instruction to the PMIC controller 128 to shut off the respective voltage regulator. Alternatively, the power manager 132 may do this by opening a power switch (not shown) coupled between the respective voltage regulator and respective supply rail. In another example, the power manager 132 may dynamically scale the supply voltage of a power domain based on the performance needs (e.g., processing needs) of a circuit (e.g., processor) in the power domain. In this example, the power manager 132 may determine a supply voltage for the power domain based on the performance needs of the circuit, and send an instruction to the PMIC controller 128 to set the supply voltage of the power domain to the determined supply voltage.

Figure 2:
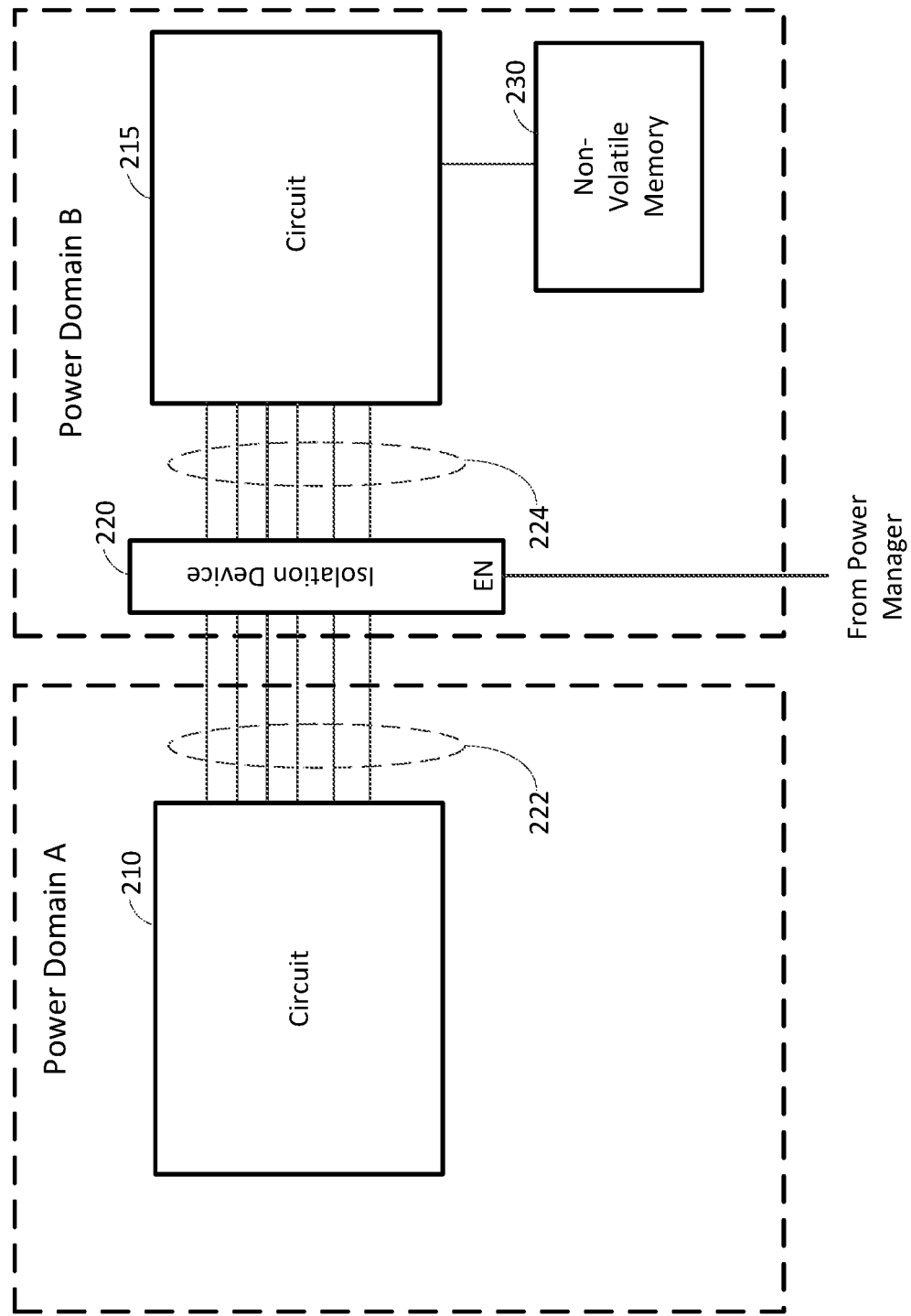
FIG. 2 shows an example of an isolation device, a circuit and a non-volatile memory, wherein the isolation device is used for isolating the circuit in one power domain from another power domain according to certain aspects of the present disclosure.

FIG. 2 shows an example in which Power Domain B includes a circuit 215, an isolation device 220, and a non-volatile memory 230. The supply rail 136 (shown in FIG. 1A) may supply power to the circuit 215, the isolation device 220, and the non-volatile memory 230 in Power Domain B. For ease of illustration, the supply rail 136 and the back-up power source 140 are not shown in FIG. 2.

In operation, the circuit 215 communicates with another circuit 210 located in Power Domain A through the isolation device 220. For example, the circuits 210 and 215 may exchange data and/or commands with one another via signal lines, which cross between Power Domains A and B. If Power Domains A and B have different voltage levels, then the chip 130 may include voltage-level shifters (not shown) for converting signals from the voltage-level of one of the power domains to the voltage-level of the other power domain. The circuit 210 in Power Domain A may receive power from supply rail 134 (shown in FIG. 1A).

The isolation device 220 is configured to selectively isolate the circuit 215 in Power Domain B from Power Domain A based on an enable signal received at the enable input (labeled "EN") of the isolation device 220 from the power manager 132. When the enable signal is not asserted (e.g., the enable signal is logic zero or low), the isolation device 220 is disabled and allow signals to pass between Power Domains A and B via the signal lines. When the enable signal is asserted (e.g., the enable signal is logic one or high), the isolation device 220 is enabled and isolates the circuit 215 from Power Domain A. The isolation device 220 may isolate the circuit 215 from Power Domain A by clamping the portions 224 of the signal lines in Power Domain B to fixed logic states. In this way, the logic states of the portions 224 of the signal lines in Power Domain B may be fixed regardless of the logic states of the portions 222 of the signal lines in Power Domain A.

The power manager 132 (shown in FIG. 1A) may handle control of the isolation device 220. For example, when the power manager 132 is about to collapse Power Domain A, the power manager 132 may enable the isolation device 220 via the enable input EN to isolate the circuit 215 from Power Domain A. This is done to prevent Power Domain A from corrupting the circuit 215 when Power Domain A losses power.

The power manager 132 may also trigger the circuit 215 to perform certain operations when the power manager 132 is about to collapse Power Domain B. For example, the power manager 132 may instruct the circuit 215 to store current logic states of the circuit 215 in the non-volatile memory 230 before Power Domain B losses power so that the current logic states of the circuit 215 can later be restored when power to the circuit 215 is restored. In another example, the power manager 132 may instruct the circuit 215 to store critical information (e.g., security information) in the non-volatile memory 230 before Power Domain B losses power. Although FIG. 2 shows the non-volatile memory 230 located in Power Domain B, it is to be appreciated that the non-volatile memory 230 may also located in another power domain or may be external to the chip 130.

As discussed above, when Power Domain A is about to collapse, the power manager enables isolation device 220 to isolate the circuit 215 in Power Domain B from Power Domain A. This helps ensure that Power Domain B is properly isolated when Power Domain A is collapsed. However, this approach only works if the power manager knows when critical power events will occur, which is not always the case. For example, if a user unexpectedly removes the main power source 110 (e.g., battery), the power manager 132 may fail to safely isolate the circuit 215 in Power Domain B before Power Domain A loses power.

Further, the power manager 132 may fail to properly trigger the circuit 215 to save the logic states of the circuit and/or critical information in the non-volatile memory 230 prior to power loss of Power Domain B when the power manager 132 does not have foreknowledge of the power loss (e.g., due to unexpected removal of the main power source 110).

Power-failure detection mechanisms are provided according aspects of the present disclosure, which can be used to protect a power domain from power loss of a neighboring power domain and/or its own power loss, as discussed further below.

Figure 3:
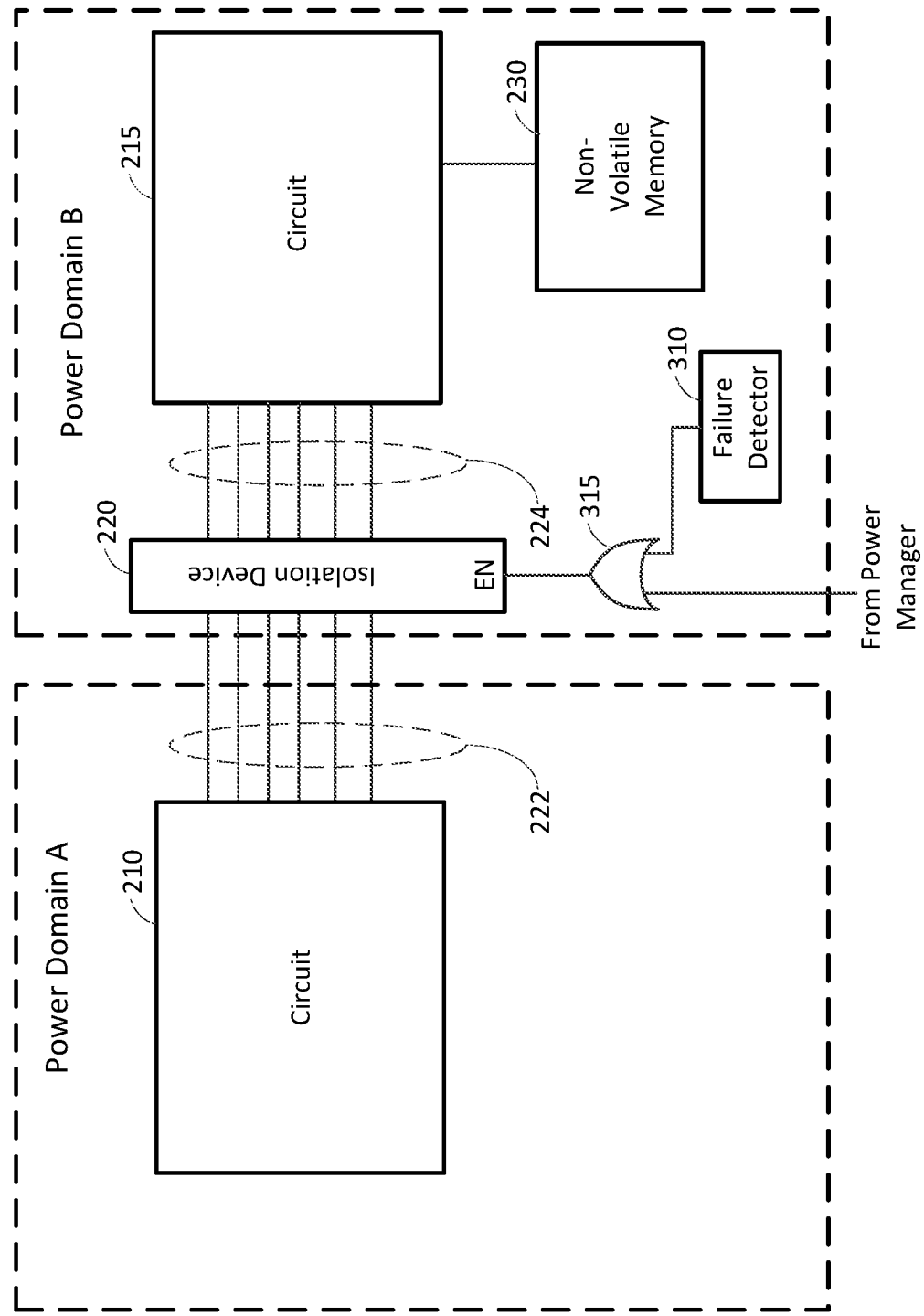
FIG. 3 shows an example of a failure detector for detecting imminent power failure of a power domain.

FIG. 3 shows an example in which the Power Domain B further includes a failure detector 310 according to embodiments of the present disclosure. The failure detector 310 is configured to detect an imminent power failure of Power Domain A, and to protect Power Domain B in response to the detection of the imminent power failure, as discussed further below.

In certain aspects, the failure detector 310 monitors the supply voltage VddA of Power Domain A. In these aspects, the failure detector 310 compares the monitored supply voltage VddA with a voltage threshold. The voltage threshold may be at or close to the minimum supply voltage required for the circuit 210 in Power Domain A to function properly. When the monitored supply voltage VddA drops (falls) below the voltage threshold, the failure detector 310 enables the isolation device 220 to isolate the circuit 215 in Power Domain B from Power Domain A. By isolating the circuit 215 from Power Domain A, the failure detector 310 prevents the power loss of Power Domain A from corrupting the circuit 215. As discussed above, the isolation device 220 may isolate the circuit 215 from Power Domain A by clamping the portions 224 of the signal lines in Power Domain B to fixed logic states. The failure detector 310 may receive power from supply rail 136 (shown in FIG. 1A).

In the example shown in FIG. 3, Power Domain B further includes an OR gate 315 that couples the power manager 132 and the failure detector 310 to the enable input EN of the isolation device 220. Assuming that the isolation device 220 is enabled when the enable input EN is high (i.e., logic one), the OR gate 315 allows either the power manager 132 or the failure detector 310 to enable the isolation device 220. This is because the output of the OR gate 315 (which is coupled to the enable input EN) is high if the enable signal from either the power manager 132 or the failure detector 310 is high or if the enable signals from both the power manager 132 and the failure detector 310 are high. Thus, the power manager 132 is still able to enable the isolation device 220 in cases where the power manager 132 is aware that Power Domain A is about to lose power. The failure detector 310 may enable the isolation device 220 in cases where the power manager 132 is not aware of an imminent power loss (e.g., due to an unexpected power loss).

Figure 4:
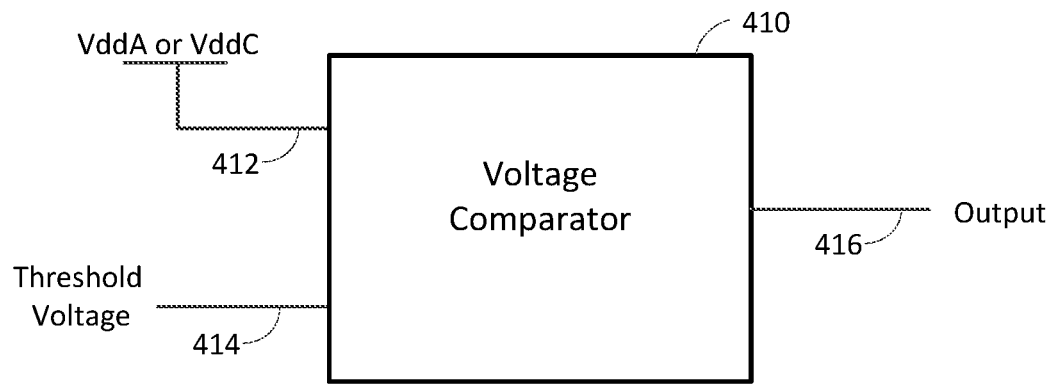
FIG. 4 shows an exemplary implementation of the failure detector including a voltage comparator according to certain aspects of the present disclosure.

FIG. 4 shows an exemplary implementation of the failure detector 310. In this example, the failure detector 310 includes a voltage comparator 410 having a first input 412, a second input 414, and an output 416. The first input 412 may be coupled to the supply rail 134 (shown in FIG. 1A) of Power Domain A for monitoring the supply voltage VddA of Power Domain A. The second input 414 receives the threshold voltage, which may be at or close to the minimum supply voltage required for the circuit 210 in Power A to function properly, as discussed above. The output 416 of the voltage comparator 410 is coupled to the enable input EN of the isolation device 220 (e.g., via the OR gate 315 or directly).

The voltage comparator 410 compares the supply voltage VddA with the threshold voltage, and outputs a one or a zero to the enable input EN of the isolation device 220 based on the comparison. More particularly, the voltage comparator 410 outputs a zero if the supply voltage VddA is above the threshold voltage. In this case, the failure detector 310 does not enable the isolation device 220. It is to be appreciated that the power manager 132 may still enable the isolation device 220 in this case. The voltage comparator 410 outputs a one if the supply voltage VddA is below the threshold voltage. In this case, the failure detector 310 enables the isolation device 220 to isolate the circuit 215 in Power Domain B from Power Domain A.

Figure 5:
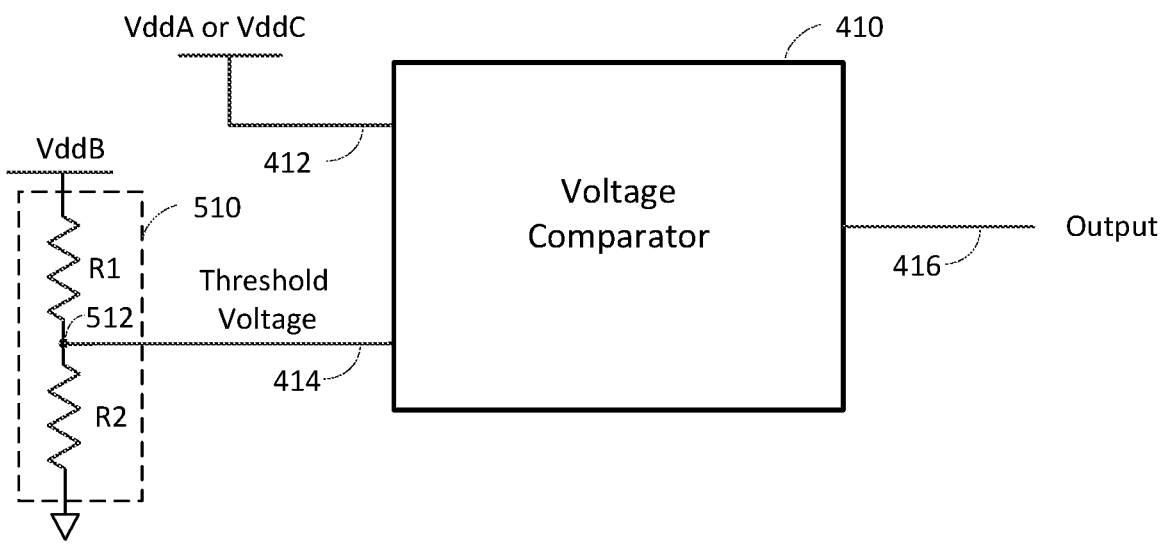
FIG. 5 shows an example of a voltage scaler for scaling down a supply voltage to generate a threshold voltage for the voltage comparator according to certain aspects of the present disclosure.

FIG. 5 shows an example in which the failure detector 310 includes a voltage scaler 510 for generating the threshold voltage. In this example, the nominal (expected) voltage level of the supply voltage VddA of Power Domain A is lower than the nominal (expected) voltage level of the supply voltage VddB of Power Domain B. In operation, the voltage scaler 510 scales down the voltage level of the supply voltage VddB of Power Domain B to generate the threshold voltage.

In the example shown in FIG. 5, the voltage scaler 510 is implemented with a voltage divider including a first resistor R1 and a second resistor R2 coupled in series between supply voltage VddB and ground. The threshold voltage is taken at node 512 between the first resistor R1 and the second resistor R2, as shown in FIG. 5. In this example, the threshold voltage is given by:

$$V_{th} = \frac{R2 * VddB}{R1 + R2} \quad \text{(Eq. 1)}$$

where R1 and R2 in the equation are the resistances of the first resistor R1 and the second resistor R2, respectively, and Vth is the threshold voltage. As can been seen from the equation, the threshold voltage can be set to a desired voltage level by setting the resistances of the first resistor R1 and the second resistor R2 accordingly to generate the desired threshold voltage at node 512.

It is to be appreciated that the failure detector 310 is not limited to the above examples, and may monitor another supply voltage that is indicative of an imminent power collapse of Power Domain A. For example, the first input 412 of the voltage comparator 410 may be coupled to the supply rail 138 of Power Domain C to monitor the supply voltage VddC of Power Domain C. In this example, the supply voltage VddC of Power Domain C may decay faster and/or earlier than the supply voltage of Power Domain A due to power loss at the PMIC 120 (e.g., caused by unexpected removal of the main power source 110). Thus, a drop in the supply voltage VddC of Power Domain C may be indicative of an imminent power collapse of Power Domain A, and therefore may be used to detect an imminent power collapse of Power Domain A.

In this example, the voltage comparator 410 compares the supply voltage VddC with the threshold voltage, and outputs a one or a zero to the enable input EN of the isolation device 220 based on the comparison. More particularly, the voltage comparator 410 outputs a zero if the supply voltage VddC is above the threshold voltage. In this case, the failure detector 310 does not enable the isolation device 220. The voltage comparator 410 outputs a one if the supply voltage VddC is below the threshold voltage. In this case, the failure detector 310 enables the isolation device 220 to isolate the circuit 215 in Power Domain B from Power Domain A. In this example, the threshold voltage may be generated by the voltage scaler 510 (shown in FIG. 5), in which the threshold voltage is a scaled-down version of supply voltage VddB. In FIGS. 4 and 5, the label "VddA or VddC" indicates that the first input 412 of the voltage comparator 410 may be coupled to either VddA or VddC.

Figure 6:
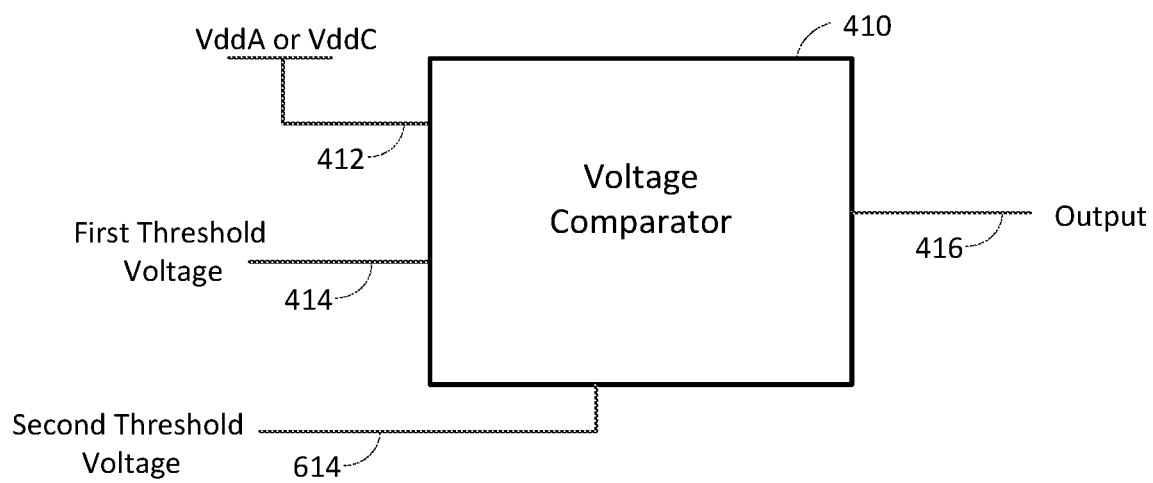
FIG. 6 shows another exemplary implementation of the failure detector according to certain aspects of the present disclosure.

FIG. 6 shows an example in which the voltage comparator 410 has a third input 614 that receives a second threshold voltage. Note that the threshold voltage discussed above with reference FIG. 4 has been relabeled the "first threshold voltage" in FIG. 6. The second threshold voltage may be slightly higher than the first threshold voltage. As discussed further below, the second threshold voltage is used to prevent glitches at the output 416 of the voltage comparator 410.

In this example, the voltage comparator 410 compares a supply voltage (e.g., VddA or VddC) with the first threshold voltage, and outputs a one or a zero to the enable input EN of the isolation device 220 based on the comparison. More particularly, the voltage comparator 410 outputs a zero if the supply voltage is above the first threshold voltage. When the supply voltage falls below the first threshold voltage, the voltage comparator 410 outputs a one, in which case the voltage comparator 410 enables the isolation device 220.

Once the supply voltage falls below the first threshold voltage, the voltage comparator 410 compares the supply voltage with the second threshold voltage. If the supply voltage is below the second threshold voltage, then the voltage comparator 410 outputs a one (keeps the isolation device 220 enabled). If the supply voltage rises above the second threshold voltage, then the voltage comparator 410 outputs a zero, in which case the isolation device 220 is disabled. After the isolation device 220 is disabled, the voltage comparator 410 returns to comparing the supply voltage with the first threshold voltage, as discussed above. This prevents glitches at the output 416 of the voltage comparator 410 (e.g., prevents the output 416 from toggling between zero and one) when the voltage at the first input 412 crosses the first threshold voltage multiple times due to small fluctuations in the voltage (e.g., caused by noise). In this regard, the second threshold voltage may be set at a voltage level that is sufficient to prevent unwanted glitches.

As discussed above, the back-up power source 140 coupled to the supply rail 136 of Power Domain B continues to power Power Domain B for a short period of time in the event of power loss at the PMIC 120 (e.g., due to unexpected removal of the main power source 110). As a result, the back-up power source 140 allows the circuit 215 in Power Domain B to continue to function after Power Domain A has collapsed due to power loss at the PMIC 120. Thus, in the event of power loss at the PMIC 120, the failure detector 310 allows the circuit 215 in Power Domain B to function after Power Domain A has collapsed without being corrupted by the power collapse of Power Domain A by isolating the circuit 215 from Power Domain A.

In certain aspects, the circuit 215 may perform emergency operations when the failure detector 310 detects an imminent power collapse of Power Domain A. The emergency operations may be operations that can be performed by the circuit 215 within the short period of time the back-up power source is able to power Power Domain B after power loss at the PMIC 120 (e.g., due to unexpected removal of the main power source 110).

Figure 7:
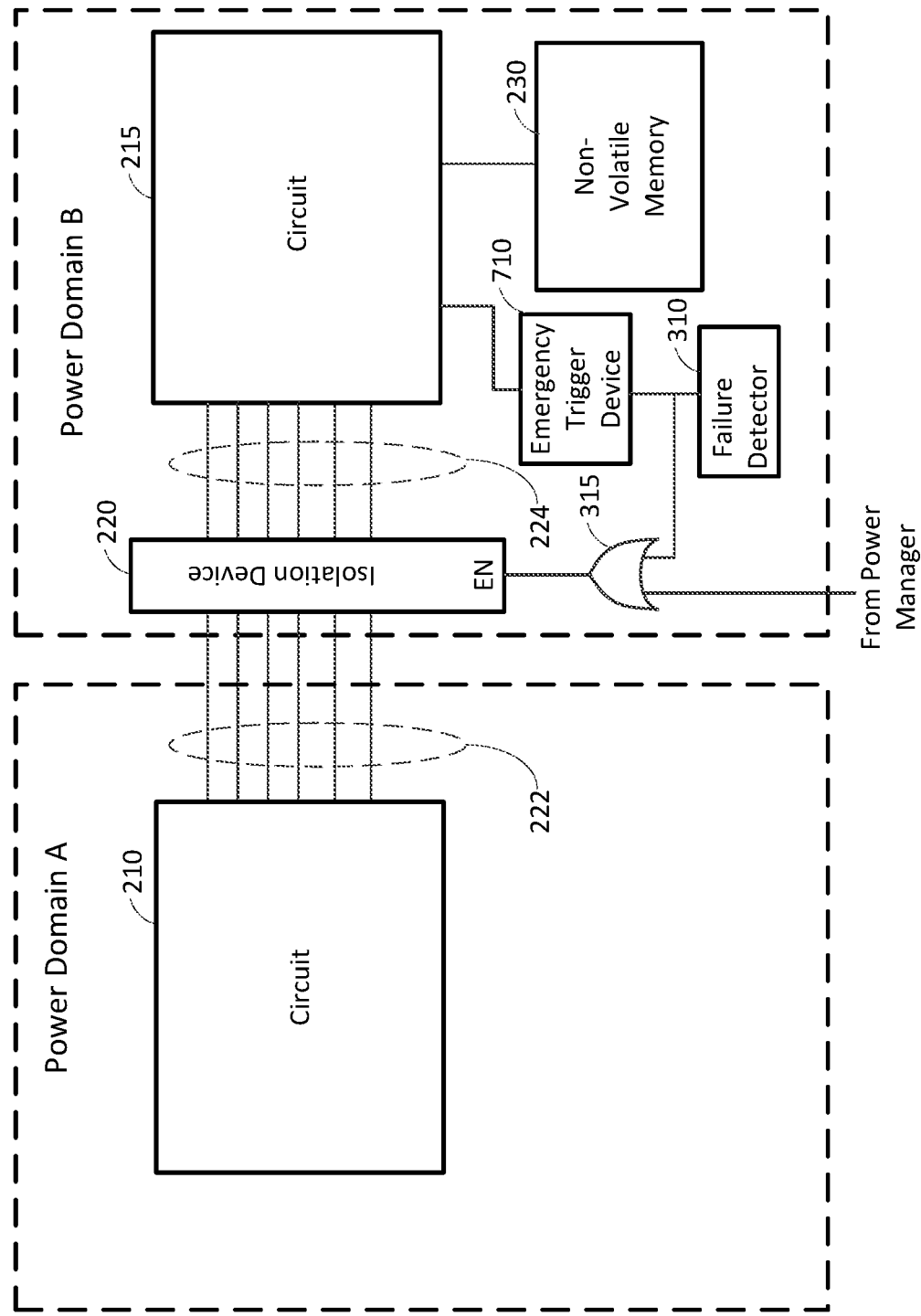
FIG. 7 shows an example of an emergency trigger device for triggering emergency operations in response to detection of an imminent power collapse according to certain aspects of the present disclosure.

In this regard, FIG. 7 shows an example in which the chip further includes an emergency trigger device 710. The emergency trigger device 710 is configured to trigger the circuit 215 to perform the emergency operations when the failure detector 310 detects an imminent failure of Power Domain A. For example, the emergency trigger device 710 may be coupled to the same output of the failure detector 310 as the isolation device 220. For the example in which the failure detector 310 outputs a logic one to enable the isolation device 220, the emergency trigger device 710 may trigger (or initiate) the emergency operations when the output of the failure detector 310 is high (i.e., logic one). The trigger device 710 may receive power from the supply rail 136 (shown in FIG. 1A).

The emergency operations may include storing current logic states of the circuit 215 in the non-volatile memory 230. This allows the current logic states to be loaded back into the circuit 215 when power is later restored to Power Domain B to restore the current logic states in the circuit 215. In another example, the emergency operations may include storing critical information (e.g., security information) in the non-volatile memory 230. This way, the critical information is not lost when Power Domain B collapses. Although FIG. 7 shows the non-volatile memory 230 located in Power Domain B, it is to be appreciated that the non-volatile memory may be located in another power domain or external to the chip 130.

Figure 8:
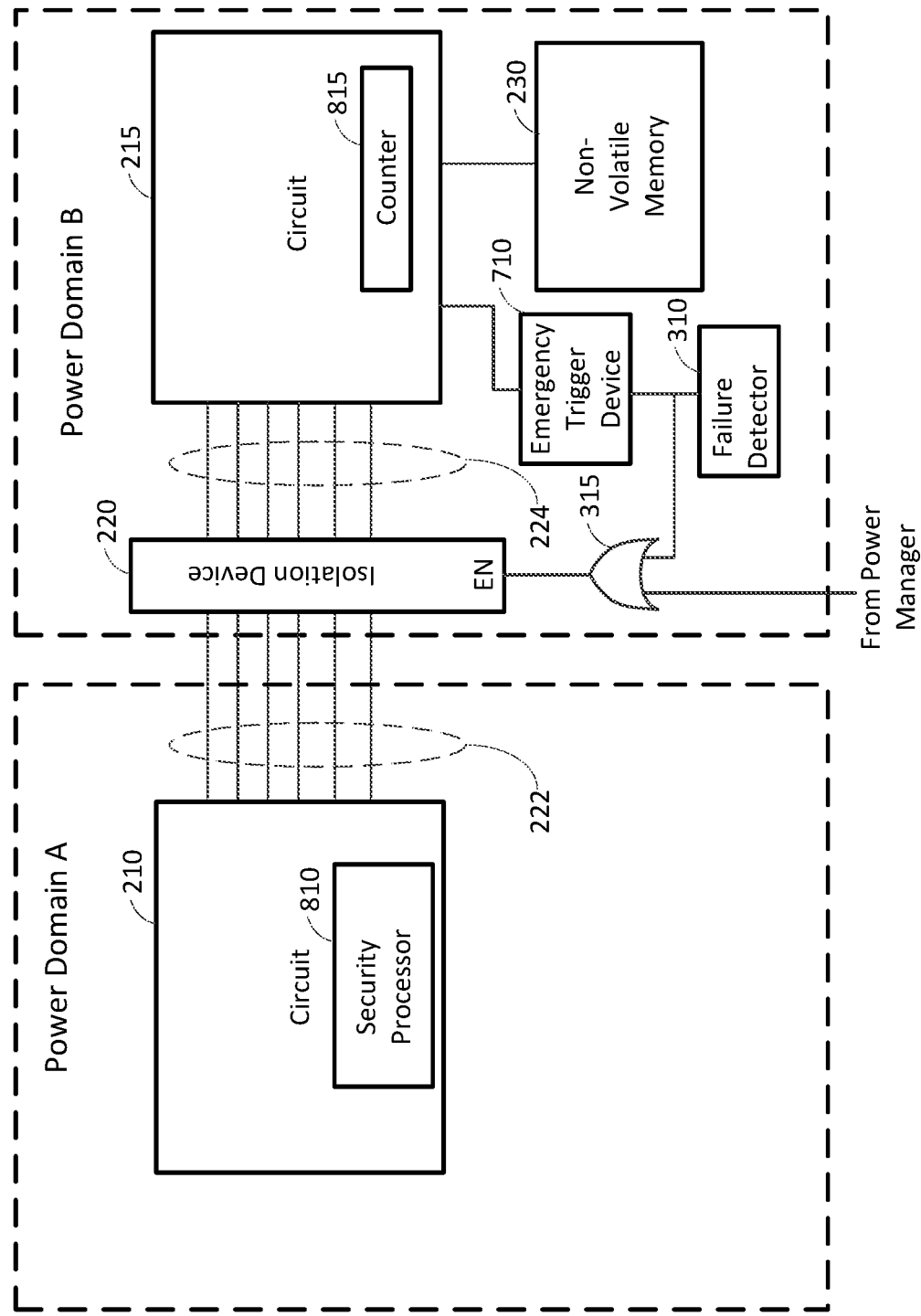
FIG. 8 shows an example of a circuit configured to store security information in a non-volatile memory in response to detection of an imminent power collapse according to certain aspects of the present disclosure.

FIG. 8 shows an example in which the circuit 215 holds security information that may be saved in the non-volatile memory 230 as part of the emergency operations discussed above. In this example, the circuit 210 in Power Domain A includes a security processor 810, and the circuit 215 in Power Domain B includes a counter 815. The security processor 810 is configured to perform security operations to prevent tampering of data stored in a memory by an attacker (e.g., a hacker and/or malicious program). The memory (not shown) may be a non-volatile memory that is external to the chip 130. As used herein, the term "data" may also include code (e.g., firmware code).

In operation, when the security processor 810 updates data, the security processor 810 increments a count value in the counter 815 by sending a command to the circuit 215 to increment the count value. The security processor 810 then generates a key using the count value, and applies a keyed-hash algorithm on at least a portion of the data using the key to generate (calculate) a cryptographic signature (also referred to as a digital signature). The security processor 810 then stores the data and the cryptographic signature in the memory (e.g., off-chip non-volatile memory). In this example, the count value in the counter 815 may indicate the current version of the data stored in the memory.

When the security processor 810 reads back the data from the memory, the security processor 810 also reads back the cryptographic signature from the memory. The security processor 810 then generates a key using the current count value in the counter 815 and applies the keyed-hash algorithm on at least a portion of the read data using the key to regenerate (recalculate) a cryptographic signature. The security processor 810 then compares the read cryptographic signature with the regenerated cryptographic signature. If the signatures match, then the security processor 810 determines that the read data is valid (e.g., has not been modified by an attacker). If the signatures do not match, then the security processor 810 determines that the read data is not valid, and prevents the data from being used (e.g., executed).

The above security procedure prevents a rollback attack in which an attacker stores an older version of the data and cryptographic signature in the memory. This is because the key used to generate the cryptographic signature for the older version of the data was generated based on an older count value. As a result, when the security processor generates a key using the current count value, and regenerates (recalculates) the cryptographic signature using the key based on the current count value, the read cryptographic signature and the regenerated cryptographic signature will not match.

In order for the above security procedure to work, it is important that the current count value in the counter 815 be stored in the non-volatile memory 230 in event of unexpected power loss (e.g., due to unexpected removal of the main power source 110). This allows the current count value to be restored to the counter 815 when power is restored. In this regard, the emergency operations triggered by the emergency trigger device 710 may include the circuit 215 storing the current count value in the count 815 in the non-volatile memory 230.

In one example, the non-volatile memory 230 may include one-time programmable memory. The one-time programmable memory may include fuses, where each fuse is capable of storing a bit. In this example, a fuse may have a default bit value (e.g., zero), which can be changed to another bit value (e.g., one) by blowing the fuse. Since the one-time programmable memory has a limited number of fuses, the circuit 215 may only store the count value in the one-time programmable memory in response to a trigger from the emergency device 710 to avoid exhausting the available space in the one-time programmable memory. During a normal power down managed by the power manager 132, the circuit 215 may store the count value in another memory (e.g., a memory that is not one-time programmable).

As discussed above, after the isolation device 220 is enabled, the failure detector 310 may disable the isolation device 220 (e.g., when the supply voltage being monitored rises above the second threshold voltage). This may occur, for example, when the power loss at the PMIC 120 is temporary and power is restored at the PMIC 120 (e.g., when the main power source 110 is restored). In one example, when power is restored at the PMIC 120, the failure detector 310 may wait unit the circuit 215 completes an emergency procedure before disabling the isolation device 220. For example, after the isolation device 220 is enabled and the emergency procedure is initiated, the failure detector 310 may require that both the monitored supply voltage rise above the second threshold voltage and the emergency procedure be completed before disabling the isolation device 220. For the example in which the emergency procedure includes writing security information and/or state information in the non-volatile memory 230 (e.g., by blowing fuses in the non-volatile memory 230), the failure detector 310 may consider the emergency procedure complete when the writing operation is finished. In this example, the circuit 215 may inform the failure detector 310 when the writing operation is finished.

As discussed above, the failure detector 310 detects an imminent power collapse of Power Domain A by monitoring supply voltage VddA or supply voltage VddC. In some aspects, an imminent power collapse of Power Domain A may also signal an imminent power collapse of Power Domain B (e.g., due to unexpected removal of the main power source 110). In these aspects, the collapse of Power Domain B may be delayed from the collapse of Power Domain A due to the back-up power source 140, which is able to power Power Domain B after power loss at the PMIC 120. This allows time for the isolation device 220 to isolate the circuit 215 from Power Domain A and/or the circuit 215 to perform emergency operations when the failure detector 310 detects an imminent power failure. Thus, the output of the failure detector 310 may also indicate an imminent collapse of Power Domain B, in which the collapse of Power Domain B is delayed from the collapse of Power Domain A due to the back-up power source 140, as discussed above.

In the above discussion, detection of an imminent collapse of Power Domain A may provide enough time for the isolation device 220 to isolate the circuit 215 in Power Domain B from Power Domain A to prevent the collapse of Power Domain A from corrupting the circuit 215. Detection of an imminent collapse of Power Domain B may provide enough time for the circuit 215 to complete emergency operations before the collapse of Power Domain B.

Figure 9:
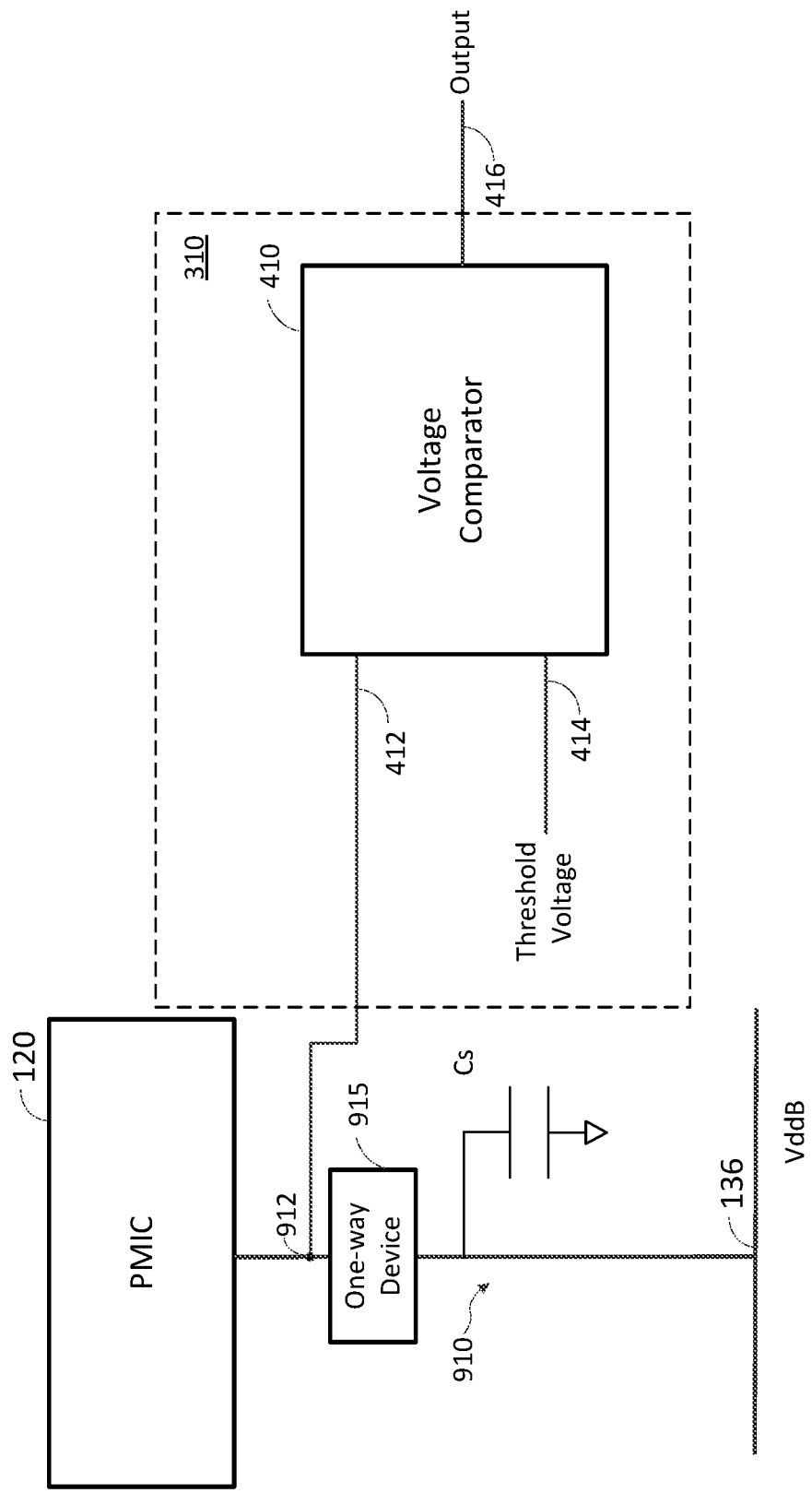
FIG. 9 shows another exemplary implementation of the failure detector in which the failure detector monitors a voltage upstream of a storage capacitor according to certain aspects of the present disclosure.

FIG. 9 shows an exemplary implementation of the failure detector 310, in which the failure detector 310 is configured to detect an imminent collapse of Power Domain B (e.g., due to power loss at the PMIC 120). FIG. 9 also shows the power distribution network (PDN) 910 that distributes power from the PMIC 120 to Power Domain B. The PDN 910 includes the interconnect from the PMIC 120 to the chip 130, the metallization on the chip 130 between the interconnect and the power rail 136, and the power rail 136. The interconnect may include parasitic inductance and resistance. FIG. 9 also shows the storage capacitor Cs, which powers Power Domain B for a short period of time after power loss at the PMIC 120, as discussed above. FIG. 9 further shows a one-way device 915 configured to allow current flow in the direction from the PMIC 120 to the power rail 136 while blocking current flow in the reverse direction, as discussed further below.

In this example, the failure detector 310 includes the voltage comparator 410. The first input 412 of the voltage comparator 410 is coupled to the PDN 910 at a node 912 located upstream of the storage capacitor Cs. The node 912 is upstream of the storage capacitor Cs in the sense that node 912 is located closer to the PMIC 120 on the PDN 910 than the storage capacitor Cs. The second input 412 of the voltage comparator 410 receives a threshold voltage. The output 416 of the voltage comparator 410 is coupled to the isolation device 220 and/or the emergency trigger device 710.

In this example, it is assumed that the voltage at node 912 decays faster and/or earlier than the supply voltage VddB at the supply rail 136 of Power Domain B in the event of power loss at the PMIC 120. This is because node 912 is located upstream of the storage capacitor Cs while the supply rail 136 of Power Domain B is located downstream of the storage capacitor Cs, as shown in FIG. 9. Thus, a drop in the voltage at node 912 may be indicative of an imminent collapse of Power Domain B, and can therefore be used detect an imminent collapse of Power Domain B.

When power is lost at the PMIC 120, the one-way device 915 blocks current flow from the storage capacitor Cs to node 912. This prevents current from the storage capacitor Cs from leaking into the input 412 of the voltage comparator 410, which would prevent the voltage comparator 410 from detecting the power loss. The one-way device 915 may be implemented with a diode, a switch or another type of one-way device. For the example of a diode, the diode is coupled between node 912 and the storage capacitor Cs, and is orientated to allow current flow in the direction from the PMIC 120 to the power rail 136 and block current flow in the reverse direction. For the example of a switch, the one-way device 915 may include the switch and a controller, in which the switch is coupled between node 912 and the storage capacitor Cs. In this example, the controller turns on (closes) the switch when the PMIC 120 is powered, and turns off (opens) the switch when there is a power loss at the PMIC 120. The controller may detect the power loss by monitoring a voltage at the PMIC 120, and detecting the power loss when the monitored voltage drops falls below a certain voltage level.

In operation, the voltage comparator 410 compares the voltage at node 912 with the threshold voltage, and outputs a one or a zero based on the comparison. More particularly, the voltage comparator 410 outputs a zero if the voltage is above the threshold voltage. In this case, the failure detector 310 does not enable the isolation device 220 and/or the emergency trigger device 710. The voltage comparator 410 outputs a one if the voltage is below the threshold voltage. In this case, the failure detector 310 enables the isolation device 220 and/or the emergency trigger device 710.

Figure 10:
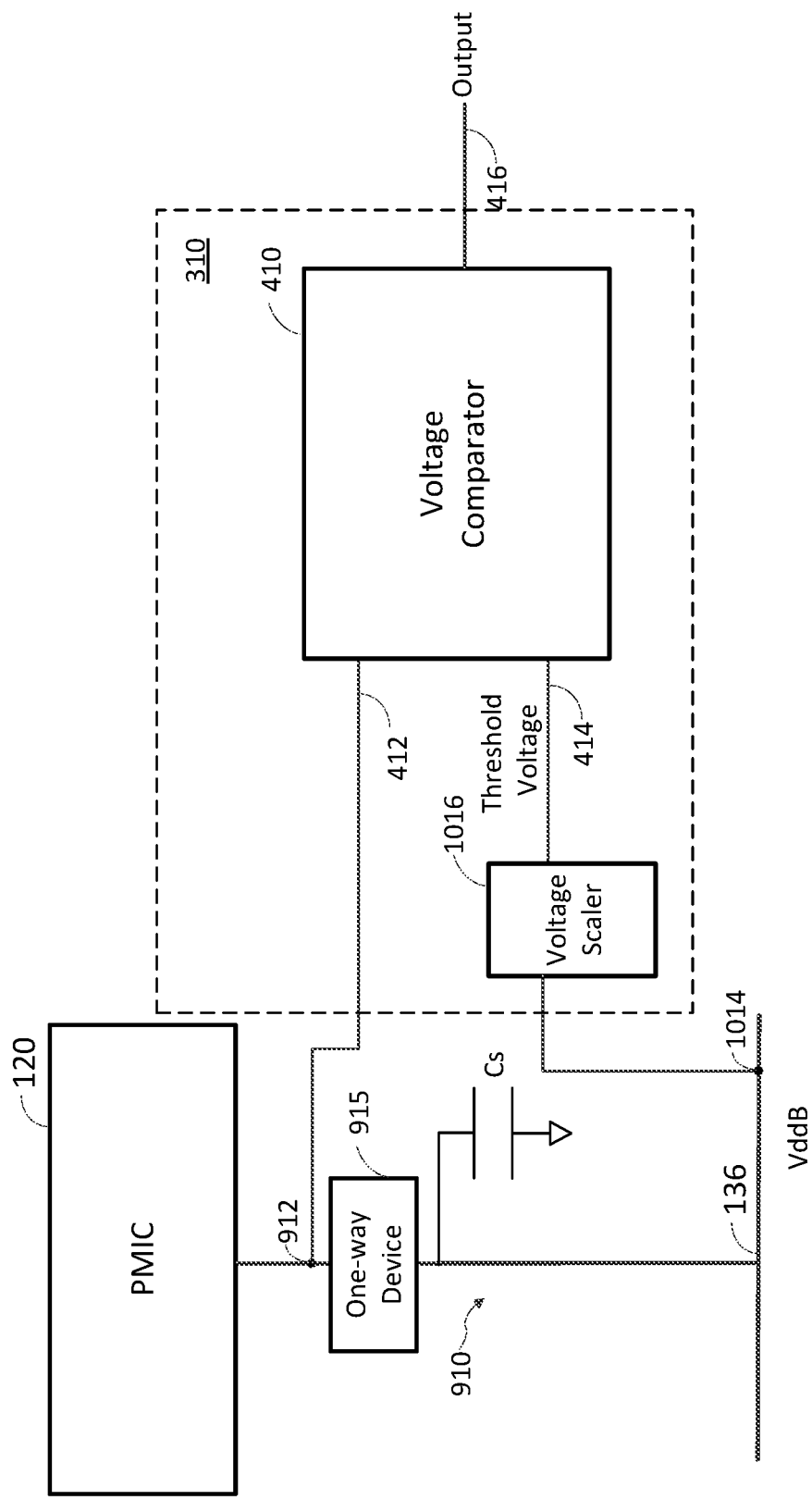
FIG. 10 shows the exemplary failure detector in FIG. 9 further including a voltage scaler for generating a threshold voltage according to certain aspects of the present disclosure.

FIG. 10 shows an example is which the failure detector 310 includes a voltage scaler 1016 for generating the threshold voltage shown in FIG. 9. In this example, the voltage scaler 1016 is coupled to the supply voltage VddB at a node 1014 on the supply rail 136, which is located downstream of the storage capacitor Cs. The voltage scaler 1016 scales down the supply voltage VddB to generate the threshold voltage, which is input to the second input 414 of the voltage comparator. The voltage scaler 1016 may be implemented using the exemplary voltage scaler 510 shown in FIG. 5, where the threshold voltage is given by equation (1).

It is to be appreciated that the voltage comparator 410 shown in FIGS. 9 and 10 may be implemented with the voltage comparator 410 shown in FIG. 6, in which the voltage comparator 410 also receives the second threshold voltage. As discussed above, in this implementation, the voltage comparator 410 compares the voltage at the first input 412 with the second threshold voltage once the voltage falls below the first threshold voltage to prevent glitches at the output 416.

Figure 11:
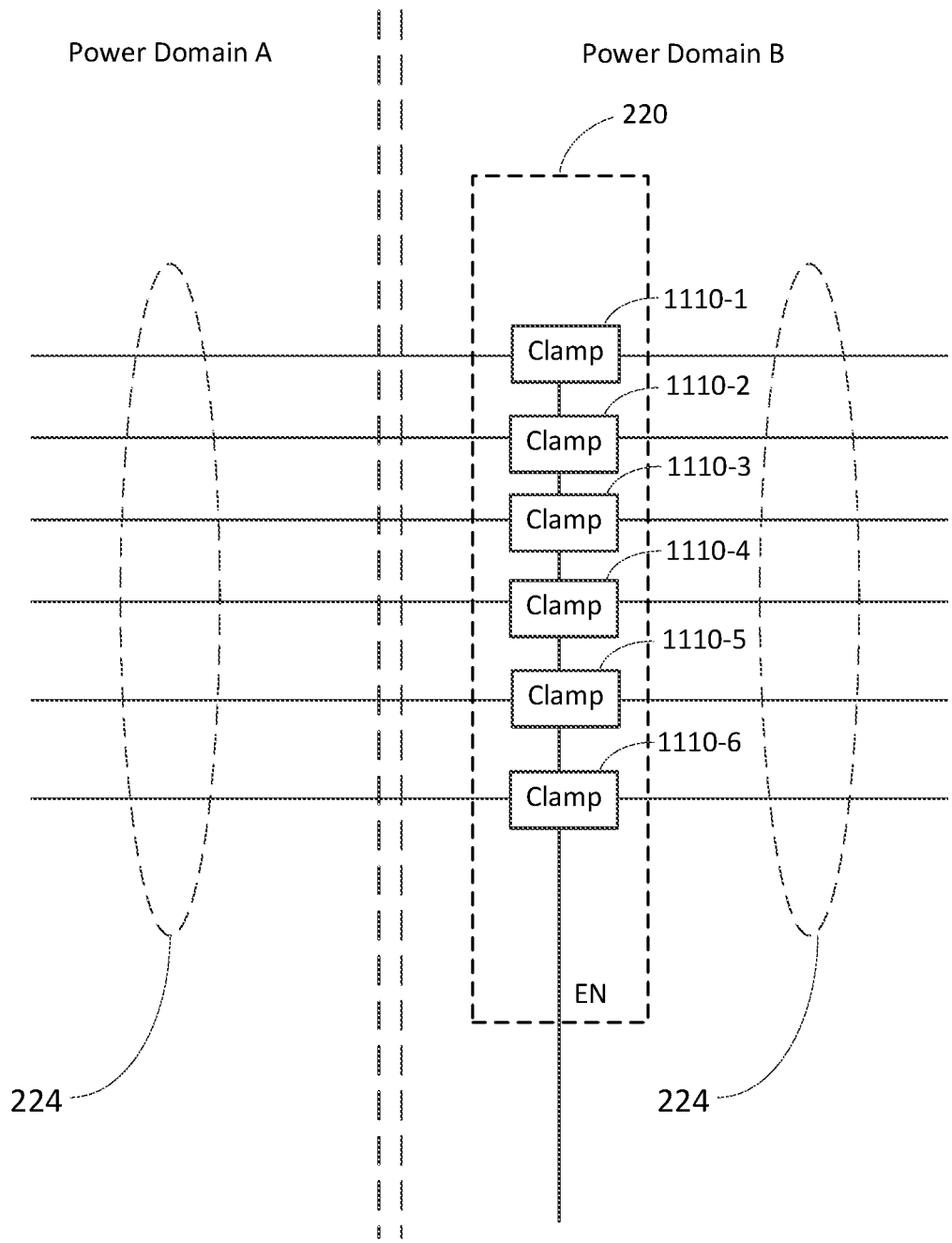
FIG. 11 shows an exemplary implementation of the isolation device according to certain aspects of the present disclosure.

FIG. 11 shows an exemplary implementation of the isolation device 220 according to certain aspects of the present disclosure. In this example, the isolation device 220 includes multiple clamp devices 1110-1 to 1110-6, in which each of the clamp devices corresponds to a respective one of the signal lines crossing between Power Domain A and Power Domain B. Each clamp device is configured to pass a signal on the respective signal line when the enable signal is not asserted (e.g. the enable signal is logic zero or low). Each clamp device is configured to clamp the portion 224 of the respective signal line in Power Domain B to a fixed logic state when the enable signal is asserted (e.g. the enable signal is logic one or high). Each clamp device may be one of three types of clamp device, as discussed further below.

A first type of clamp device is a keeper clamp device. A keeper clamp device passes the signal on the respective signal line when the enable signal is not asserted (e.g., the enable signal is logic zero or low). The keeper clamp device latches the logic state on the respective signal line when the enable signal is asserted, and fixes the portion 224 of the respective signal line in Power Domain B to the latched logic state. For example, the keeper clamp device may latch the logic state at the time the enable signal transitions from zero to one (i.e., on a rising edge of the enable signal).

Figure 12:
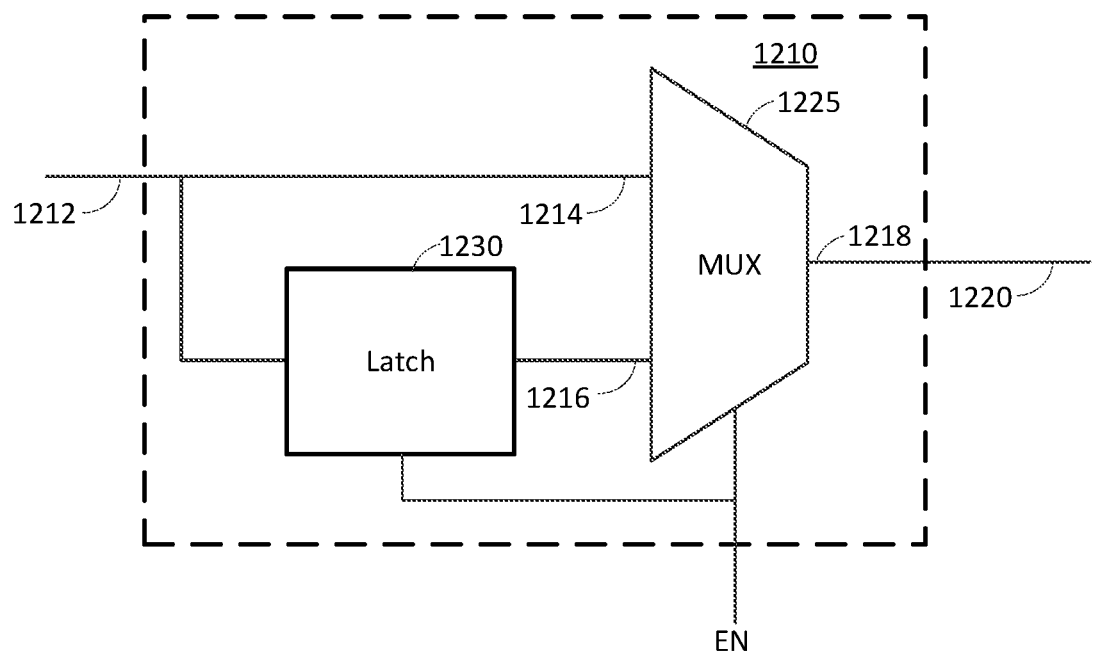
FIG. 12 shows an exemplary implementation of a keeper clamp device according to certain aspects of the present disclosure.

FIG. 12 shows an exemplary implementation of a keeper clamp device 1210 according to certain aspects of the present disclosure. In this example, the keeper clamp device 1210 includes a multiplexer 1225, and a latch 1230. The multiplexer 1225 has a first input 1214 coupled to the input 1212 of the keeper clamp device 1210, a second input 1216 coupled to the latch 1230, and an output 1218 coupled to the output 1220 of the keeper clamp device 1210. The latch 1230 is coupled between the input 1212 of the keeper clamp device 1210 and the second input 1216 of the multiplexer

1225. The input 1212 of the keeper clamp device 1210 is coupled to the portion 222 of the respective signal line in Power Domain A, and the output 1220 of the keeper clamp device 1210 is coupled to the portion 224 of the respective signal line in Power Domain B.

The multiplexer 1225 is configured to selectively couple the first input 1214 or the second input 1216 of the multiplexer 1225 to the output 1220 of the keeper clamp device 1210 under the control of the enable signal. More particularly, the multiplexer 1225 is configured to couple the first input 1214 to the output 1220 of the keeper clamp device 1210 when the enable signal is not asserted (e.g., the enable signal is logic zero or low), and to couple the second input 1214 to the output 1220 of the keeper clamp device 1210 when the enable signal is asserted (e.g., the enable signal is logic one or high). The latch 1230 is configured to latch the logic state at the input 1212 of the keeper clamp device when the enable signal is asserted, and output the latched logic state to the second input 1216 of the multiplexer 1225. For example, the latch may latch the logic state at the time the enable signal transitions from zero to one (i.e., on a rising edge of the enable signal).

In operation, when the enable signal is not asserted (e.g., the enable signal is logic zero or low), the multiplexer 1225 couples the portion 222 of the respective signal line in Power Domain A to the portion 224 of the respective signal line in Power Domain B. This allows a signal to pass from Power Domain A to Power Domain B via the respective signal line. When the enable signal is asserted, the latch 1230 latches the logic state on the respective signal line and the multiplexer 1225 outputs the latched logic state on the portion 224 of the respective signal line in Power Domain B. Thus, the keeper clamp device 1210 fixes the portion 224 of the respective signal line in Power Domain B to the latched logic state.

A second type of clamp device is a fix-at-one clamp device. A fix-at-one clamp device passes the signal on the respective signal line when the enable signal is not asserted (e.g., the enable signal is logic zero or low). The fix-at-one clamp device fixes the portion 224 of the respective signal line in Power Domain B to logic one (high logic state) when the enable signal is asserted (e.g., the enable signal is logic one or high).

Figure 13A:
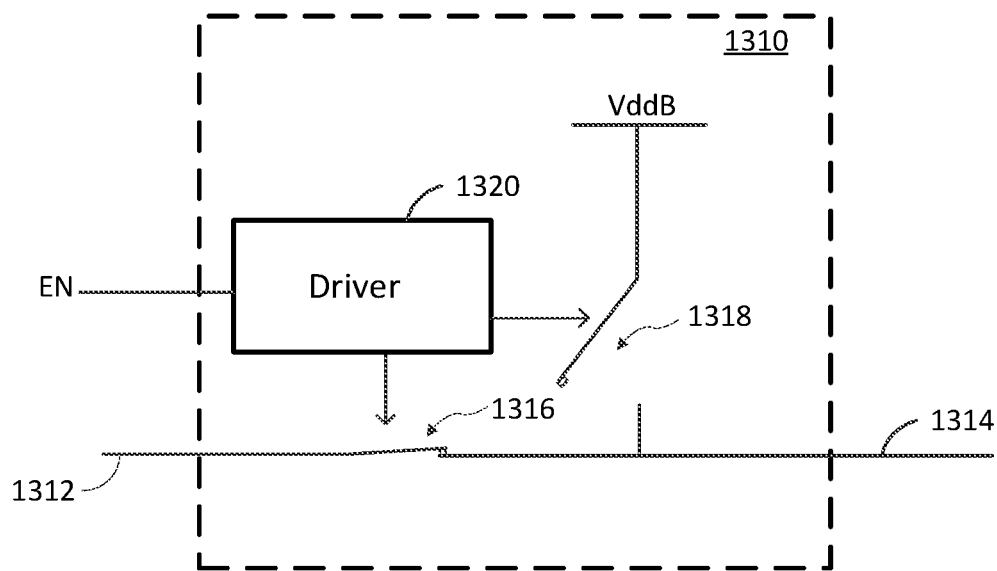
FIG. 13A shows an exemplary implementation of a fix-at-one clamp device in which switches in the clamp device allow a signal to pass through the clamp device when the clamp device is disabled according to certain aspects of the present disclosure.

FIG. 13A shows an exemplary implementation of a fix-at-one clamp device 1310 according to certain aspects of the present disclosure. In this example, the fix-at-one clamp device 1310 includes a first switch device 1316, a second switch device 1318, and a driver 1320. The first switch device 1316 is between the input 1312 and the output 1314 of the clamp device 1310, and the second switch device 1318 is between the output 1314 of the clamp device 1310 and supply voltage VddB. The driver 1320 is configured to receive the enable signal and to control the on/off states of the switches 1316 and 1318 based on the received enable signal, as discussed further below. The input 1312 of the clamp device 1310 is coupled to the portion 222 of the respective signal line in Power Domain A, and the output 1314 of the clamp device 1310 is coupled to the portion 224 of the respective signal line in Power Domain B.

In operation, when the enable signal is not asserted (e.g., the enable signal is logic zero or low), the driver 1320 turns on (closes) the first switch device 1316 and turns off (opens) the second switch device 1318. This allows a signal on the respective signal line to pass from Power Domain A to Power Domain B through the first switch device 1316. FIG. 13A shows an example in which the first switch device 1316 is closed and the second switch device 1318 is open.

Figure 13B:
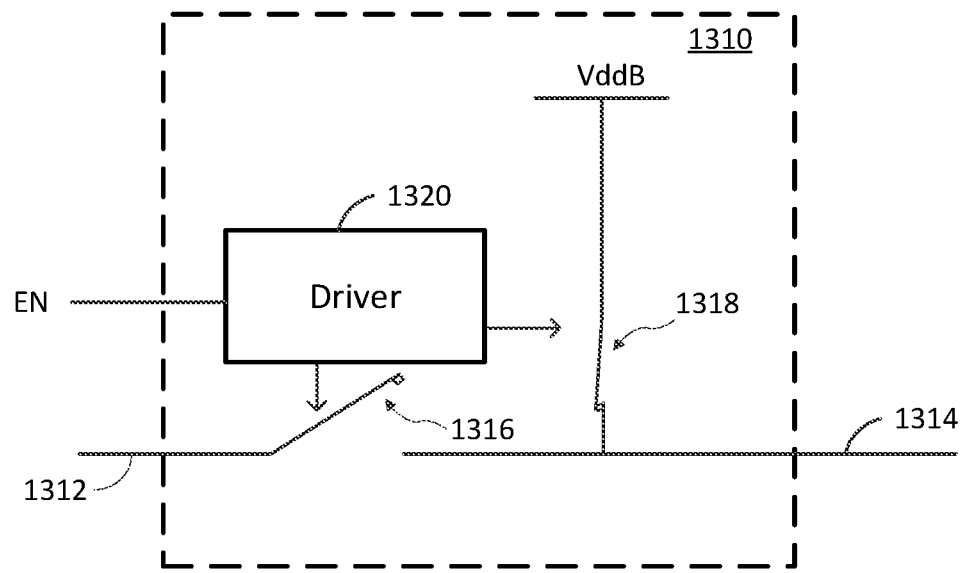
FIG. 13B shows the fix-at-one clamp device in which the switches in the clamp device clamp a portion of the signal line to logic one when the clamp device is enabled according to certain aspects of the present disclosure.

When the enable signal is asserted (e.g., the enable signal is logic one or high), the driver 1320 turns off (opens) the first switch device 1316 and turns on (closes) the second switch device 1318. This fixes the portion 224 of the respective signal line in Power Domain B to logic one. FIG. 13B shows an example in which the first switch device 1316 is open and the second switch device 1318 is closed.

It is to be appreciated that the switch devices may be directly driven by the enable signal, in which case the driver 1320 may be omitted.

A third type of clamp device is a fix-at-zero clamp device. A fix-at-zero clamp device passes the signal on the respective signal line when the enable signal is not asserted (e.g., the enable signal is logic zero or low). The fix-at-zero clamp device fixes the portion 224 of the respective signal line in Power Domain B to logic zero (low logic state) when the enable signal is asserted (e.g., the enable signal is logic one or high).

Figure 14A:
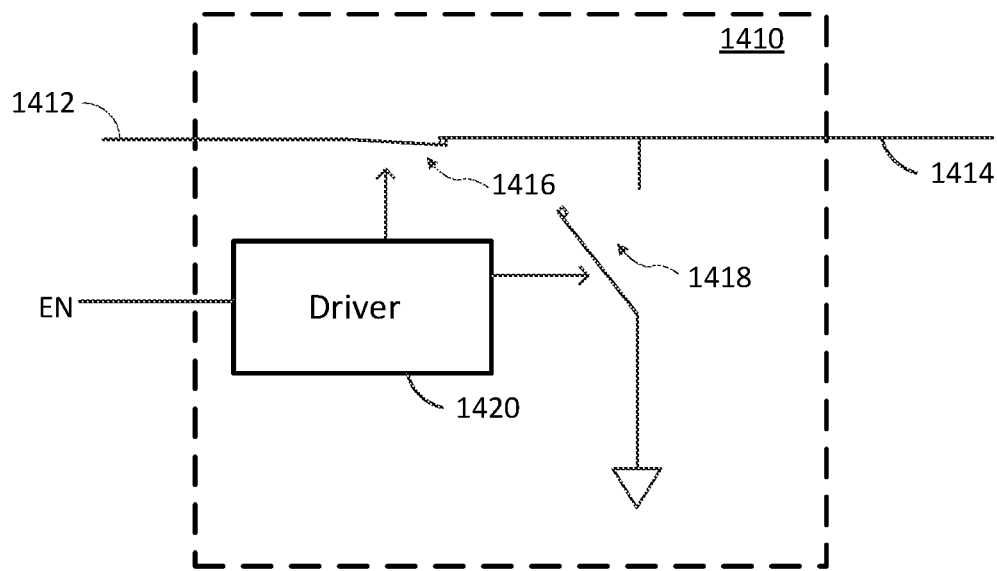
FIG. 14A shows an exemplary implementation of a fix-at-zero clamp device in which switches in the clamp device allow a signal to pass through the clamp device when the clamp device is disabled according to certain aspects of the present disclosure.

FIG. 14A shows an exemplary implementation of a fix-at-zero clamp device 1410 according to certain aspects of the present disclosure. In this example, the fix-at-zero clamp device 1410 includes a first switch device 1416, a second switch device 1418, and a driver 1420. The first switch device 1416 is between the input 1412 and the output 1414 of the clamp device 1410, and the second switch device 1418 is between the output 1414 of the clamp device 1410 and ground. The driver 1420 is configured to receive the enable signal and to control the on/off states of the switches 1416 and 1418 based on the received enable signal, as discussed further below. The input 1412 of the clamp device 1410 is coupled to the portion 222 of the respective signal line in Power Domain A, and the output 1414 of the clamp device 1410 is coupled to the portion 224 of the respective signal line in Power Domain B.

In operation, when the enable signal is not asserted (e.g., the enable signal is logic zero or low), the driver 1420 turns on (closes) the first switch device 1416 and turns off (opens) the second switch device 1418. This allows a signal on the respective signal line to pass from Power Domain A to Power Domain B through the first switch device 1416. FIG. 14A shows an example in which the first switch device 1416 is closed and the second switch device 1418 is open.

Figure 14B:
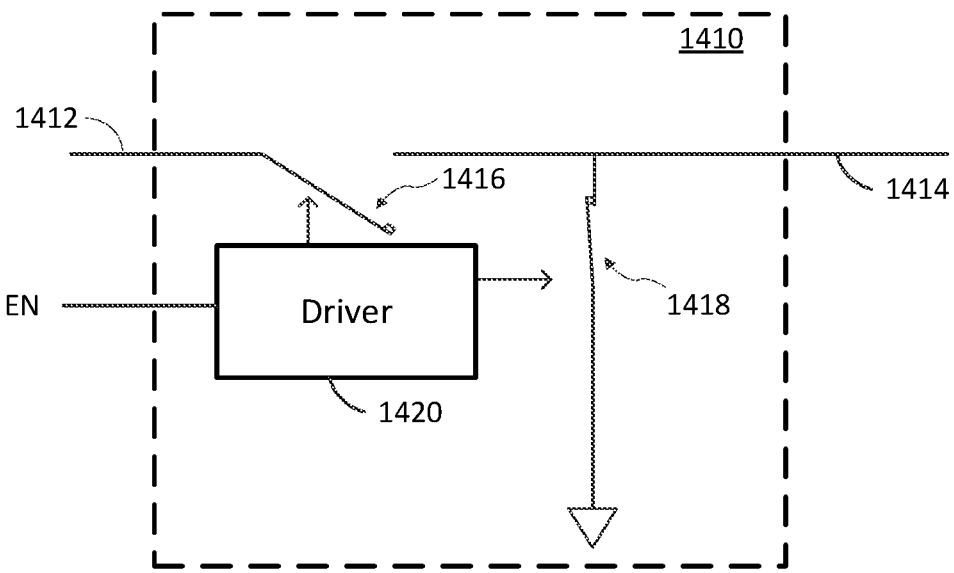
FIG. 14B shows the fix-at-zero clamp device in which the switches in the clamp device clamp a portion of the signal line to logic zero when the clamp device is enabled according to certain aspects of the present disclosure.

When the enable signal is asserted (e.g., the enable signal is logic one or high), the driver 1420 turns off (opens) the first switch device 1416 and turns on (closes) the second switch device 1318. This fixes the portion 224 of the respective signal line in Power Domain B to logic zero. FIG. 14B shows an example in which the first switch device 1416 is open and the second switch device 1418 is closed.

It is to be appreciated that the switch devices may be directly driven by the enable signal, in which case the driver 1420 may be omitted.

The clamp devices 1110-1 to 1110-6 in the isolation device 220 may all be of the same type. Alternatively, the clamp devices 1110-1 to 1110-6 may be a mix of different types. For example, one of the clamp devices 1110-1 to 1110-6 may be a keeper clamp device while another one of the claim devices 1110-1 to 1110-6 may be a fix-at-one clamp device or a fix-at-zero clamp device.

Figure 15:
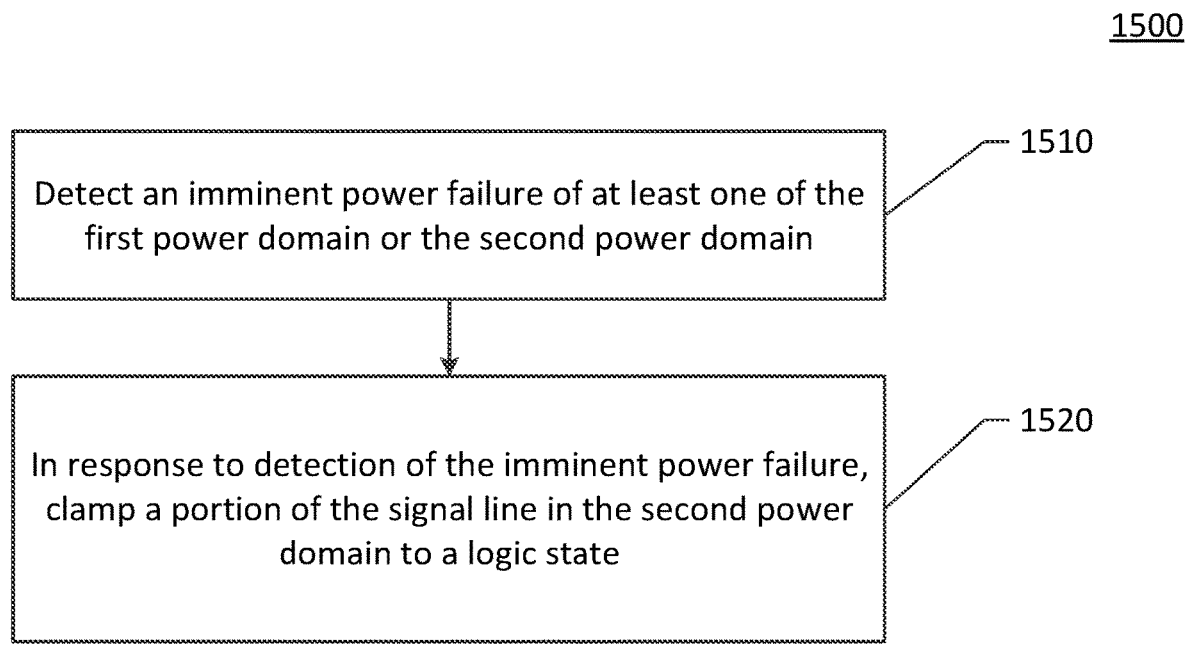
FIG. 15 is a flowchart illustrating a method for power failure mitigation according to certain aspects of the present disclosure.

FIG. 15 shows a flowchart illustrating a method 1500 for power failure mitigation on a chip according to certain aspects of the present disclosure. The chip includes a first circuit (e.g., circuit 210) in a first power domain (e.g., Power Domain A), a second circuit (e.g., circuit 215) in a second power domain (e.g., Power Domain B), and a signal line that provides communication between the first and second circuits and crosses between the first and second power domains.

At step 1510, an imminent power failure of at least one of the first power domain or the second power domain is detected. For example, the imminent power failure may be detected by comparing a supply voltage of the first power domain (e.g., Power Domain A) or a third power domain (e.g., Power Domain C) with a threshold voltage, and detecting the imminent power failure if the supply voltage is below the threshold voltage.

At step 1520, in response to detection of the imminent power failure, a portion of the signal line in the second power domain is clamped to a logic state. For example, the portion of the signal line in the second power domain may be clamped to one or zero. In another example, a logic state of the signal line may be latched and the portion of the signal line in the second power domain may be clamped to the latched logic state.

In the above examples, the failure detector 310 may detect an imminent power collapse by comparing a monitored voltage with a voltage threshold using a voltage comparator. However, it is to be appreciated that the present disclosure is not limited to these examples. For instance, the failure detector 310 may detect an imminent power collapse by detecting a symptom of a drop in the voltage. For example, a drop in the supply voltage VddA of Power Domain A may cause the error rate of signals from the circuit 210 in Power Domain A to increase. In this example, the failure detector 310 may monitor the error rate of signals from the circuit 210 in Power Domain A, and detect an imminent power collapse of Power Domain A when the error rate rises above an error threshold. Thus, the failure detector 310 may indirectly detect a voltage drop by detecting a symptom of the voltage drop.

In the above example, the failure detector 310 outputs a one to enable the isolation device 220 and/or the emergency trigger device 710, and outputs a zero to disable the isolation device 220 and/or the emergency trigger device 710. However, it is to be appreciated that the logic may be reversed, in which the failure detector 310 outputs a zero to enable the isolation device 220 and/or the emergency trigger device 710, and outputs a one to disable the isolation device 220 and/or the emergency trigger device 710. In this case, a keeper claim device may latch the logic state on the respective signal line when the enable signal transitions from one to zero.

It is to be appreciated that the enable signal may be a multiple-bit signal. For example, when the enabled signal is asserted, the enable signal may also specify which clamp devices in the isolation device 220 are to be enabled (engaged).

It is to be appreciated that the present disclosure is not limited to the terminology used above to describe the present disclosure. For example, a power domain may also be referred to as a power island, a voltage domain, etc.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two components. The term "circuit" is used broadly, and intended to cover hardware implementations of electrical devices and conductors that, when connected and configured, enable the performance of the functions described in the present disclosure. The term "circuit" is also intended to cover software implementations, in which a processor performs the functions described herein by executing software comprising code for performing the functions. The software may be stored on a computer-readable storage medium, such as a RAM, a ROM, an EEPROM, an optical disk, and/or a magnetic disk.

It is to be understood that present disclosure is not limited to the specific order or hierarchy of steps in the methods disclosed herein. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The failure detector discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A chip, comprising:
   an isolation device, wherein the isolation device is configured to allow a signal to pass from a first circuit in a first power domain to a second circuit in a second power domain via a signal line that crosses between the first and second power domains when the isolation device is disabled, and to clamp a portion of the signal line in the second power domain to a logic state when the isolation device is enabled;
   a failure detector configured to detect an imminent power failure of at least one of the first power domain or the second power domain, and to enable the isolation device in response to detection of the imminent power failure; and
   a trigger device configured to trigger the second circuit to perform operations in response to detection of the imminent power failure, wherein the operations include at least one of storing current logic states of the second circuit in a non-volatile memory or storing security information in the non-volatile memory.

2. The chip of claim 1, wherein the failure detector comprises a voltage comparator configured to compare a supply voltage with a threshold voltage, to disable the isolation device if the supply voltage is above the threshold voltage, and to enable the isolation device if the supply voltage is below the threshold voltage.

3. The chip of claim 2, wherein the failure detector further comprises a voltage scaler configured to scale down a supply voltage of the second power domain to generate the threshold voltage.

4. The chip of claim 3, wherein the scaler comprises a voltage divider including a first resistor and a second resistor coupled in series between the supply voltage of the second power domain and a ground, wherein the threshold voltage is taken at a node between the first resistor and the second resistor.

5. The chip of claim 3, wherein the comparator is configured to compare the supply voltage of the first power domain with the threshold voltage.

6. The chip of claim 2, wherein the supply voltage is a supply voltage of the first power domain or a supply voltage of a third power domain.

7. The chip of claim 1, wherein the failure detector comprises a voltage comparator configured to compare a supply voltage with a first threshold voltage, to disable the isolation device if the supply voltage is above the first threshold voltage, to enable the isolation device if the supply voltage is below the first threshold voltage, and, after the supply voltage falls below the first threshold voltage, to disable the isolation device if the supply voltage rises above a second threshold voltage, the second threshold voltage being higher than the first threshold voltage.

8. The chip of claim 7, wherein the supply voltage is a supply voltage of the first power domain or a supply voltage of a third power domain.

9. The chip of claim 1, wherein the failure detector comprises a voltage comparator configured to compare a voltage on a power distribution network with a threshold voltage, to disable the isolation device if the voltage is above the threshold voltage, and to enable the isolation device if the voltage is below the threshold, wherein the power distribution network supplies power from a main power source to the second power domain.

10. The chip of claim 9, wherein a back-up power source is coupled to the power distribution network, the back-up power source is configured to provide power to the second domain for a time period after power loss of the main power source, and the voltage on the power distribution network is upstream of the back-up power source.

11. The chip of claim 10, wherein the back-up power source comprises a storage capacitor.

12. The chip of claim 10, further comprising a voltage scaler configured to scale down a supply voltage of the second power domain to generate the threshold, wherein the supply voltage of the second power domain is provided by a supply rail coupled to the power distribution network and located downstream of the back-up power source.

13. The chip of claim 1, wherein the isolation device is configured to latch a logic state on the signal line and to clamp the portion of the signal in the second power domain to the latched logic state when the isolation device is enabled.

14. The chip of claim 1, wherein the isolation device is configured to clamp the portion of the signal line in the second power domain to a logic state of one or zero when the isolation device is enabled.

15. The chip of claim 1, wherein the security information includes a count value indicating a version of data stored in a memory.

16. The chip of claim 15, wherein the second circuit is configured to increment the count value in response to a command from the first circuit.

17. The chip of claim 16, wherein the first circuit is configured to send the command to the second circuit when the data stored in the memory is updated.

18. The chip of claim 1, wherein, when main power is restored after detection of the imminent power failure, the failure detector is configured to wait until the operations are completed before disabling the isolation device.

19. The chip of claim 1, wherein the failure detector is configured to detect the imminent power failure by monitoring an error rate for communication from the first circuit to the second circuit, and detecting the imminent power failure when the error rate rises above an error rate threshold.

20. A method for power failure mitigation on a chip including a first circuit in a first power domain, a second circuit in a second power domain, and a signal line that provides communication between the first and second circuits and crosses between the first and second power domains, wherein the method comprises:
    detecting an imminent power failure of at least one of the first power domain or the second power domain;
    in response to detection of the imminent power failure, clamping a portion of the signal line in the second power domain to a logic state; and
    in response to detection of the imminent power failure, performing at least one of storing current logic states of the second circuit in a non-volatile memory or storing security information in the non-volatile memory.

21. The method of claim 20, wherein detecting the imminent power failure comprises:
    comparing a supply voltage with a threshold voltage; and
    detecting the imminent power failure if the supply voltage is below the threshold voltage.

22. The method of claim 21, further comprising scaling down a supply voltage of the second power domain to generate the threshold voltage.

23. The method of claim 21, wherein the supply voltage is a supply voltage of the first power domain or a supply voltage of a third power domain.

24. The method of claim 20, wherein detecting the imminent power failure comprises:
    comparing a voltage on a power distribution network with a threshold voltage; and
    detecting the imminent power failure if the voltage is below the threshold voltage;
    wherein the power distribution network supplies power from a main power source to the second power domain.

25. The method of claim 24, wherein a back-up power source is coupled to the power distribution network, the back-up power source is configured to provide power to the second domain for a time period after loss of the main power source, and the voltage on the power distribution network is upstream of the back-up power source.

26. The method of claim 25, wherein the back-up power source comprises a storage capacitor.

27. The method of claim 20, further comprising latching a logic state on the signal line, wherein clamping the portion of the signal in the second power domain comprises clamping the portion of the signal line in the second power domain to the latched logic state.

28. An apparatus for power failure mitigation on a chip including a first circuit in a first power domain, a second circuit in a second power domain, and a signal line that provides communication between the first and second circuits and crosses between the first and second power domains, wherein the apparatus comprises:

means for detecting an imminent power failure of at least one of the first power domain or the second power domain; and means for clamping a portion of the signal line in the second power domain to a logic state in response to detection of the imminent power failure;

means for performing at least one of storing current logic states of the second circuit in a non-volatile memory or storing security information in the non-volatile memory in response to detection of the imminent power failure.

29. The apparatus of claim 28, wherein the means for detecting the imminent power failure comprises:

means for comparing a supply voltage with a threshold voltage; and means for detecting the imminent power failure if the supply voltage is below the threshold voltage.

30. The apparatus of claim 29, wherein the supply voltage is a supply voltage of the first power domain or a supply voltage of a third power domain.

* * * * *